United States Patent [19]

Wetherell et al.

[11] 4,240,707
[45] Dec. 23, 1980

[54] ALL-REFLECTIVE THREE ELEMENT OBJECTIVE

[75] Inventors: William B. Wetherell, Stoneham; David A. Womble, Lunenberg, both of Mass.

[73] Assignee: Itek Corporation, Lexington, Mass.

[21] Appl. No.: 967,535

[22] Filed: Dec. 7, 1978

[51] Int. Cl.$^3$ .............................................. G02B 5/10
[52] U.S. Cl. ................................... 350/294; 350/199
[58] Field of Search ..................... 350/27, 29, 55, 199, 350/201, 294

[56] References Cited

U.S. PATENT DOCUMENTS

| | | | |
|---|---|---|---|
| 2,306,679 | 12/1942 | Warmisham | 350/294 |
| 3,460,886 | 8/1969 | Rumsey | 350/294 |
| 3,674,334 | 7/1972 | Offner | 350/55 |
| 3,748,015 | 7/1973 | Offner | 350/55 |
| 3,811,749 | 5/1974 | Abel | 350/294 X |
| 3,821,763 | 6/1974 | Scott | 350/206 X |

OTHER PUBLICATIONS

Gelles, *Optical Engineering*, vol. 13, No. 6, Nov./Dec. 1974, pp. 534–538.
Gelles, *Journal of the Optical Society of America*, vol. 65, No. 10, Oct. 1975, pp. 1141–1143.

*Primary Examiner*—F. L. Evans
*Attorney, Agent, or Firm*—Homer O. Blair; Robert L. Nathans; Gerald H. Glanzman

[57] ABSTRACT

A compact, all-reflecting optical system for viewing distant objects. The system comprises a negative convex secondary mirror placed between a positive concave primary mirror and a positive concave tertiary mirror. The system has an eccentric field of view in that the field of view lies entirely on one side of the optical axis, and because of this, the light travelling from the object to the image will pass entirely outside the secondary mirror, both when entering the system and when travelling from the tertiary mirror to the image. Accordingly, with the present invention, there is no central obstruction and no consequent restriction on field of view and power distribution between mirrors as is found in prior art all-reflecting systems.

10 Claims, 4 Drawing Figures

ALL-REFLECTIVE THREE ELEMENT OBJECTIVE

DESCRIPTION

Technical Field

The present invention relates generally to an all-reflecting optical system for imaging distant objects. More particularly, the present invention relates to an all-reflecting, eccentric field, three element objective having a moderate focal ratio and a large field of view.

Background Art

It is generally recognized that a system designed to focus light from a distant object occupying a large field of view onto an image plane must comprise at least three optical elements to provide the minimum number of parameters necessary to correct spherical aberration, coma, astigmatism and field curvature. One of the most common of such systems is the all-refracting system known as a triplet which comprises a negative lens sandwiched between two positive lenses.

Although an all-refracting triplet is quite effective in controlling aberrations, and, thus, is very useful in many areas, it is not fully satisfactory in a significant number of applications. For example, in applications wherein a very large aperture is desired, it is impractical to use an all-refracting system because of the difficulty and expense in accurately fabricating very large lens elements, and because they flex when pointed in different directions, causing loss in image quality. In fact, the largest refracting lens ever made, for use in a telescope, is only about 40 inches in diameter. Also, refractive optical elements are generally free from chromatic aberrations only within a relatively narrow range of wavelengths, and in many applications this would not be acceptable.

Because of the inadequacies of all-refracting designs, it has been taught in the prior art to utilize systems which employ a combination of refracting and reflecting elements, or systems which are all-reflecting in nature. Reflecting elements (i.e., mirrors) offer the advantage of being somewhat easier to construct in large sizes than refractive elements since they can be made arbitrarily thick to maintain stiffness when pointed in different directions. Also, they can be made substantially lighter in weight than comparable refracting elements, and, thus, are desirable in those applications where weight is an important factor.

U.S. Pat. No. 3,460,886 to Rumsey describes a typical prior art all-reflecting triplet system. As illustrated in FIG. 1 of Rumsey, light entering the system from a distant object impinges upon a primary mirror, is reflected onto a secondary mirror, then to a tertiary mirror and finally to an image plane where an image of the distant object is formed.

A perusal of FIG. 1 of Rumsey illustrates a significant disadvantage in his design. Specifically, the secondary mirror is directly in the path of the light entering the system from the distant object. Thus, the secondary mirror acts as an obstruction, the size of which restricts the field of view of the system and the power distribution between the mirrors. Also, with this design it is difficult to provide adequate baffling to prevent stray light from reaching the image.

A variety of other all-reflecting system designs are also known in the prior art, but, in general, they suffer from the same inadequacies as found in Rumsey.

DISCLOSURE OF INVENTION

The present invention is directed to an all-reflecting triplet optical system of improved design which provides the advantageous features found in all-refracting triplet systems while, at the same time, avoids the disadvantages found in both the all-refracting and all-reflecting systems of the prior art. Like the prior art, the instant invention, according to a presently most preferred embodiment, comprises a three element mirror system consisting of a positive concave primary mirror, a negative convex secondary mirror and a positive concave tertiary mirror. The present invention, however, differs from the prior art in that it is designed to have an eccentric field of view in that the field of view is not along the optical axis of the system but lies entirely to one side of it.

Because of this design, the light travelling from the object to the image will pass entirely outside the secondary mirror both when entering the system and when travelling from the tertiary mirror to the image. Thus, with the present invention, there is no central obstruction and no consequent restriction on the field of view and on the power distribution between the mirrors.

The present invention also permits baffling against stray light to be accomplished more successfully than in the prior art, and, in general, the invention gives the lens designer the freedom of using power distribution and symmetry about the stop as well as conic constants and aspheric coefficients on the mirror surfaces for correcting aberrations. Thus, good image quality can be maintained over a substantially larger field of view than with more conventional mirror systems.

Further specific details of the invention will be set out hereinafter in conjunction with the description of the best mode for carrying out the invention.

BEST MODE FOR CARRYING OUT THE INVENTION

Figure 1:
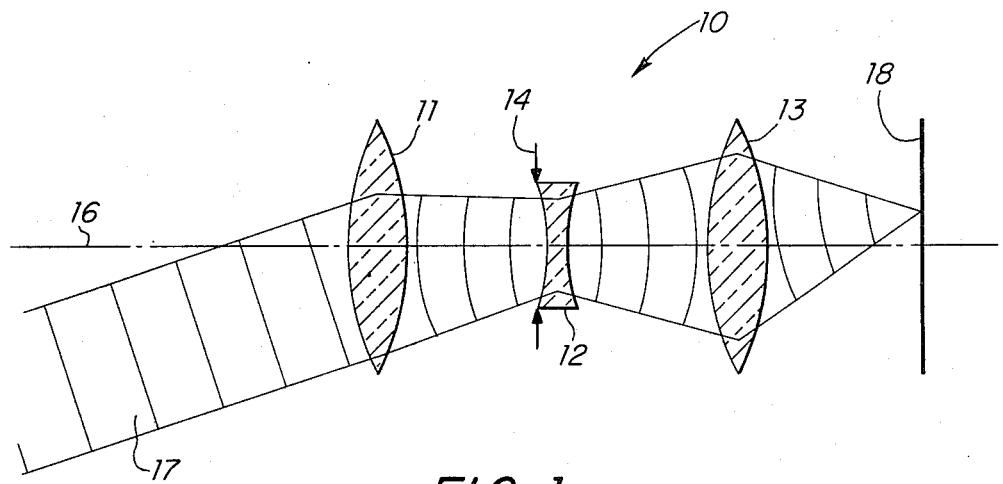
FIG. 1 schematically illustrates a typical prior art all-refracting triplet optical system for imaging distant objects.

In order to provide a better understanding of the specific features and advantages of the present invention, it is believed that a brief review of the prior art would be in order. Accordingly, FIG. 1 illustrates an all-refracting triplet optical system of conventional type which may be used for imaging distant objects. As shown, this refracting triplet, generally designated by reference number 10, consists of a negative lens 12 sandwiched between two positive lenses 11 and 13. An aperture stop, schematically illustrated at 14, is located near the negative lens and all of the elements are mounted, by conventional structure (not shown), to be rotationally symmetric with respect to the system optical axis 16.

In operation, light emanating from a distant object (not shown) will pass through the optical system as illustrated by beam 17 and be imaged on an image plane 18.

The refracting triplet of FIG. 1 gives the minimum number of parameters that are necessary to correct the system for spherical aberration, coma, astigmatism and field curvature for a moderately large field of view, with much of the ability to control these aberrations being due to the symmetry of the system and due to the fact that both the stop and the strong negative lens are centrally located.

Figure 2:
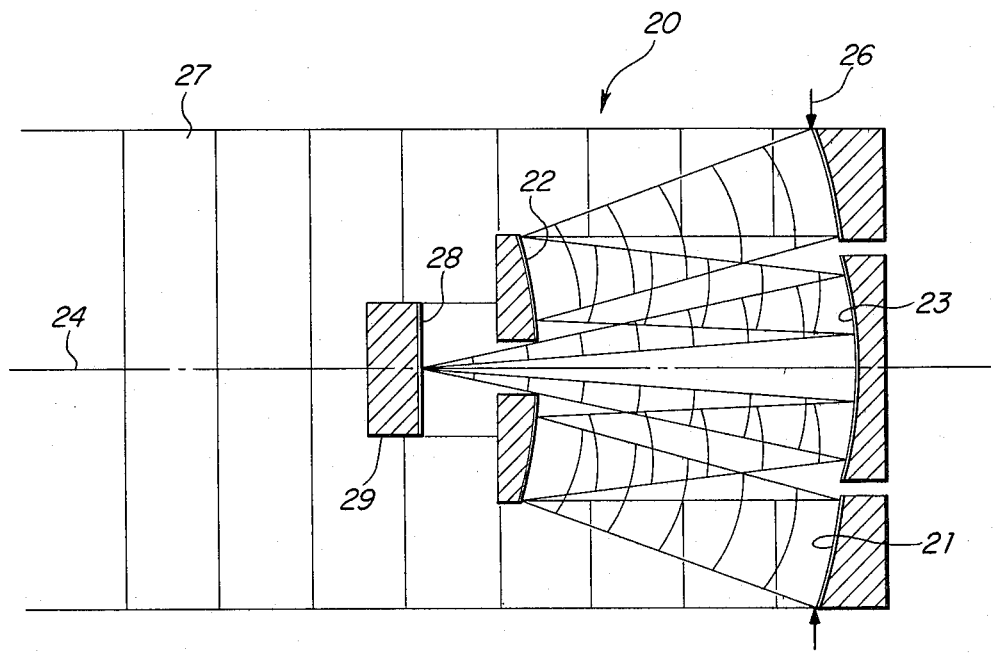
FIG. 2 schematically illustrates a typical prior art all-reflecting triplet optical system for imaging distant objects.

FIG. 2 illustrates an all-reflecting triplet optical system typical of those that are taught in the prior art. As shown, the system, generally designated by reference number 20, consists of a negative concave secondary mirror 22 positioned optically between a positive concave primary mirror 21 and a positive concave tertiary mirror 23. Primary mirror 21 is concentric with tertiary mirror 23, and all mirrors are rotationally symmetric about the system optical axis 24. A stop, schematically designated by arrows 26, is usually provided on the primary mirror 21.

In the system of FIG. 2, a light beam 27 originating from a distant object (not shown) will impinge upon primary mirror 21, be reflected onto secondary mirror 22, redirected onto tertiary mirror 23 and then be imaged on image plane 28 which usually will be on an image sensor 29.

As was mentioned previously, the inadequacies of a system of the type illustrated in FIG. 2 are readily apparent. Initially, a significant part of the light emanating from the distant object will be obstructed by secondary mirror 22 and image sensor 29 with the result being that only an annular beam of light will be able to enter into the system. This not only restricts the field of view of the system, but also the power distribution between the mirrors. The central obstruction in itself reduces image quality. In addition, in such systems it is difficult to provide adequate baffling to control stray light and prevent it from reaching the image at 28.

Figure 3:
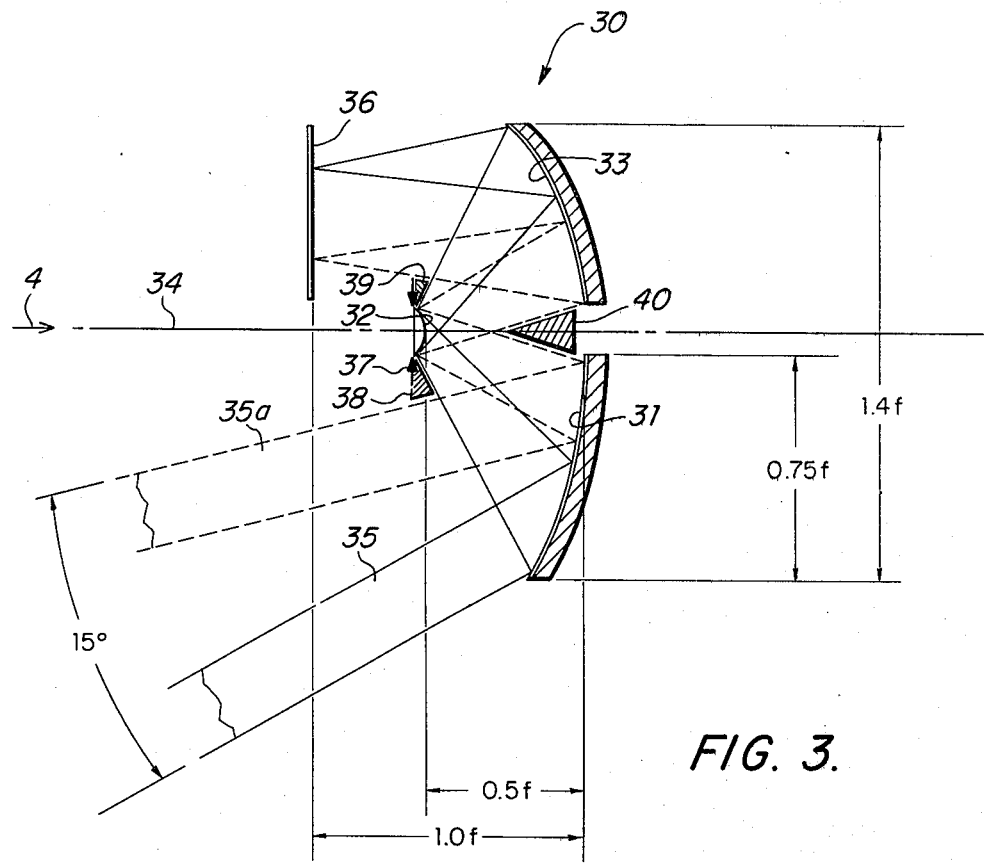
FIG. 3 schematically illustrates an all-reflecting triplet optical system for viewing distant objects in accordance with a presently most preferred embodiment of the instant invention.
Figure 4:
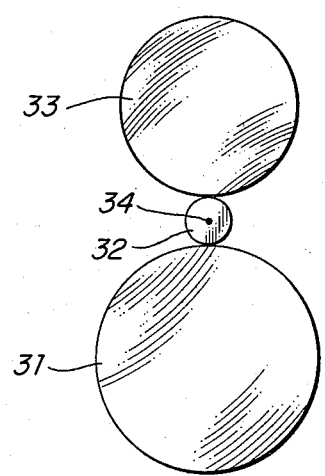
FIG. 4 illustrates the mirrors shown in FIG. 3 looking in the direction of arrow 4 of FIG. 3 to permit a clearer visualization of the preferred embodiment of the present invention.

FIGS. 3 and 4 schematically illustrate an all-reflecting objective according to a presently most preferred embodiment of the instant invention, with FIG. 4 being a view of the mirrors of FIG. 3 looking in the direction of arrow 4 of FIG. 3. As illustrated, the system, generally designated by reference number 30, includes a negative convex secondary mirror 32 positioned between a positive concave primary mirror 31 and a positive concave tertiary mirror 33.

In operation, light emanating from distant object points in different parts of the field of view (not shown but represented by solid line light beam 35 and dotted line light beam 35a) will impinge upon primary mirror 31, be reflected onto secondary mirror 32, then to tertiary mirror 33 and finally be imaged on image plane 36 which may be any suitable image sensor apparatus.

The most significant difference between the prior art all-reflecting system as exemplified in FIG. 2, and the system of the present invention is that the present invention is designed to have an eccentric field of view. In particular, the field of view of the primary mirror 31, and, hence, of the system, lies entirely on one side of the optical axis 34. Consequently, the light, in travelling from the object to the image, passes entirely outside the secondary mirror, both when entering the system and when travelling from tertiary mirror 33 to the image plane 36. Thus, with the present invention, there will be no central obstruction of the light and no consequent restriction on the field of view and on the power distribution between the mirrors.

In the embodiment of FIGS. 3 and 4, the image is formed entirely on the opposite side of the optical axis from the object. A stop 37 is provided on the secondary mirror 32. The eccentric field of view together with the stop on the secondary mirror insure that the different sections of each light beam 35 and 35a travelling between mirrors are well separated. This allows the insertion of baffles 38, 39 and 40 to control stray light which is a significant advantage over the prior art designs, which are difficult to baffle.

It should also be pointed out that in the present system, no intermediate images are formed anywhere in the optical system which is not the case of many prior art systems.

In general, the present invention provides a compact all-reflecting objective for distant objects having fields of view comparable to a refracting triplet at significantly larger aperture diameters. It also provides the advantages of an all-reflecting system in that it is lightweight and accurate within a wide range of wavelengths.

A system such as described can effectively be designed to cover a square field of 10°×10° or more, or a circular field of, for example, 15° diameter. Alternatively, it could be used to cover a very narrow but very long field of, for example, 35° or more in one direction when such an application is desired. In general, the system could be designed to cover all or any portion of a generally semi-annular shaped field extending partly around the secondary mirror and having a width of approximately 15°.

FIG. 3 also illustrates the dimensions of a typical system according to the present invention at unit focal length in order to illustrate its compactness. As can be seen, the longest separation between mirrors in the system is no more than approximately one-half of a focal length. Also, the total length of the design from mirror 31 to image plane 36 is only about one focal length. Convex secondary mirror 32 and stop 37 thereon are rotationally symmetric with respect to optical axis 34. Primary and tertiary mirror surfaces 31 and 33 are off-axis sections of surfaces which are also rotationally symmetric with respect to axis 34.

In some embodiments of the invention, however, the mirrors may be tilted or otherwise altered slightly from rotational symmetry about the optical axis 34 in order to achieve the desired level of image quality.

It should also be emphasized that the all-reflecting system of the present invention is not necessarily limited to use with visible light but can also work effectively at other wavelengths. For example, it could readily have applications in the infrared, the ultraviolet, or as an antenna system for use at radio wavelengths.

While what has been described constitutes the presently most preferred embodiment, it should be understood that the invention should not be so restricted as it could readily take other forms. Accordingly, it should be understood that the invention should be limited only insofar as required by the scope of the following claims.

I claim:

1. In an all-reflecting optical system for imaging distant objects, said optical system having an optical axis and comprising a primary mirror for receiving radiation from a distant object, and at least two additional mirrors for receiving radiation reflected from said primary mirror and for directing said radiation to an image plane for forming an image of said object thereon, the improvement comprising wherein said primary mirror, and hence said optical system, has an eccentric field of view in that said field of view is entirely on one side of said optical axis, and further wherein said image is also formed entirely on one side of said optical axis.

2. An all-reflecting optical system as recited in claim 1 wherein said primary mirror comprises a positive concave primary mirror, and wherein said at least two additional mirrors comprise a negative convex secondary mirror for receiving radiation reflected from said primary mirror, and a positive concave tertiary mirror for receiving radiation reflected from said secondary mirror and for directing said radiation to said image plane to form an image of said object thereon.

3. An all-reflecting optical system as recited in claim 2 wherein said image lies entirely on the opposite side of said optical axis from said field of view.

4. An all-reflecting optical system as recited in claim 3 wherein said secondary mirror lies on said optical axis.

5. An all-reflecting optical system as recited in claim 4 wherein said primary mirror and said tertiary mirror each comprise off-axis sections of surfaces which are rotationally symmetric with respect to said optical axis.

6. An all-reflecting optical system as recited in claim 2, wherein said primary, secondary and tertiary mirrors are positioned such that radiation, in travelling from the distant object to the image plane, passes entirely outside the secondary mirror both when entering the optical system and when travelling from the tertiary mirror to said image plane, such that there will be no central obstruction of the radiation and no restriction on the field of view.

7. An all-reflecting optical system for imaging distant objects, said optical system having an optical axis and comprising:
   a. a positive concave primary mirror for receiving light from a distant object;
   b. a negative convex secondary mirror for receiving light reflected from said primary mirror; and
   c. a positive concave tertiary mirror for receiving light reflected from said secondary mirror and for, in turn, reflecting said light to an image plane for forming an image of said object thereat, wherein
   d. said primary mirror, and hence said optical system, has an eccentric field of view in that said field of view is entirely on one side of said optical axis, and wherein said image is also located entirely on one side of said optical axis.

8. An all-reflecting optical system as recited in claim 7 wherein said primary mirror is entirely on one side of said optical axis, said tertiary mirror is entirely on the opposite side of said optical axis, said secondary mirror is on said optical axis, and said image is entirely on the opposite side of said optical axis from said primary mirror.

9. An all-reflecting optical system as recited in claim 8 and further including stop means on said secondary mirror, said stop means being rotationally symmetric with respect to said optical axis.

10. An all-reflecting optical system as recited in claim 9 wherein said primary mirror and said tertiary mirror each comprise off-axis sections of surfaces which are rotationally symmetric with respect to said optical axis.

* * * * *